US005696317A

United States Patent [19]

Rychlick

[11] Patent Number: 5,696,317

[45] Date of Patent: Dec. 9, 1997

[54] METHOD FOR CONTROLLING RATE OF PURGING OF EVAPORATIVE FUEL VAPORS

[75] Inventor: Edward George Rychlick, Canton, Mich.

[73] Assignee: Ford Global Technologies, Inc., Dearborn, Mich.

[21] Appl. No.: 712,036

[22] Filed: Sep. 11, 1996

[51] Int. Cl.[6] .......... G01M 15/00

[52] U.S. Cl. .......... 73/118.1; 73/49.7; 73/117.3; 123/520; 364/431.054; 364/431.062

[58] Field of Search .......... 73/49.7, 116, 117.2, 73/117.3, 118.1; 123/518, 519, 520; 364/431.05, 431.051, 431.054, 431.062

[56] References Cited

U.S. PATENT DOCUMENTS

| | | | |
|---|---|---|---|
| 5,243,853 | 9/1993 | Steinbrenner et al. | 73/117.3 |
| 5,469,832 | 11/1995 | Nemoto | 123/518 |
| 5,526,675 | 6/1996 | Ratton | 73/118.1 |

*Primary Examiner*—George M. Dombroske

*Attorney, Agent, or Firm*—Allan J. Lippa, Esq.; Roger L. May, Esq.

[57] ABSTRACT

A fuel canister (18) and fuel tank (14) are purged of any fuel vapors formed therein through a purge valve (22). A method (32) is used to purge the fuel canister (18) and fuel tank (14) in a manner which maintains the stoichiometric balance of fuel and air to be combusted by an internal combustion engine (12). Fuzzy logic is used to correlate the ratio of fuel to air (in mass per unit volume) to a duty cycle in which the purge valve (22) is opened. The fuzzy logic correlation includes the use of triangle functions having substantially similar period which are offset or skewed from each other by fifty percent. This allows each ratio value to be generated by two membership values which provides for a more accurate reading in a less complex manner.

13 Claims, 4 Drawing Sheets

METHOD FOR CONTROLLING RATE OF PURGING OF EVAPORATIVE FUEL VAPORS

BACKGROUND OF THE INVENTION

1. Field of the Invention

The invention relates to method of releasing evaporative fuel vapors to be combusted by an internal combustion engine. More specifically, the invention relates to a method for reducing evaporative fuel vapors at a varying rate to insure stoichiometry in the combustion of fuel and evaporative fuel vapors by an internal combustion engine.

2. Description of the Related Art

Concerns for maximizing fuel economy have resulted in the implementation of purge systems which purge evaporative fuel vapors from the fuel tank and a carbon canister, used to store evaporative fuel vapors as they escape from the fuel tank. Purging the fuel supply system, however, may disrupt the stoichiometric combustion during fuel consumption. More specifically, adding fuel vapors to the vapors already supplied during the normal combustion process of the internal combustion engine may result in unnecessary enrichment preventing the enhancement of fuel economy.

Attempts have been made to vary the rate at which the fuel vapors in the fuel tank and carbon canister are purged. These purge strategies may be complex and difficult to calibrate. There is a need in the art to develop a purge system which is responsive, accurate, and less complex.

SUMMARY OF THE INVENTION

A method is disclosed for purging fuel vapors stored in fuel canisters and fuel tanks. These fuel vapors are purged through a purge valve to be combusted by an internal combustion engine. The method includes the step of releasing fuel vapors from fuel canister and fuel tanks. The method further includes the step of measuring a mass of fuel vapors per unit volume and a first time. A mass of air is measured per unit volume at a first time. A ratio is calculated of the mass of fuel vapors to the mass of air. This ratio is correlated to a duty cycle for the purge valve. The purge valve is then opened as a function of the duty cycle to deliver the desired amount of fuel vapors to the internal combustion engine to be combusted thereby in combination with a fuel supply in the fuel tank.

One advantage associated with the invention is the ability to purge fuel vapors from fuel canister and fuel tank. Another advantage associated with the invention is the ability to purge fuel vapors in a manner responsive to stoichiometric requirements. Yet another advantage associated with the invention is the ability to purge fuel vapors stored in fuel canister and fuel tank in a non-complex manner.

BRIEF DESCRIPTION OF THE DRAWINGS

The above advantages of the invention will be more clearly understood by reading an example of an embodiment in which the invention is used to advantage with reference to the attached drawings wherein.

DESCRIPTION OF THE PREFERRED EMBODIMENT(S)

Figure 1:
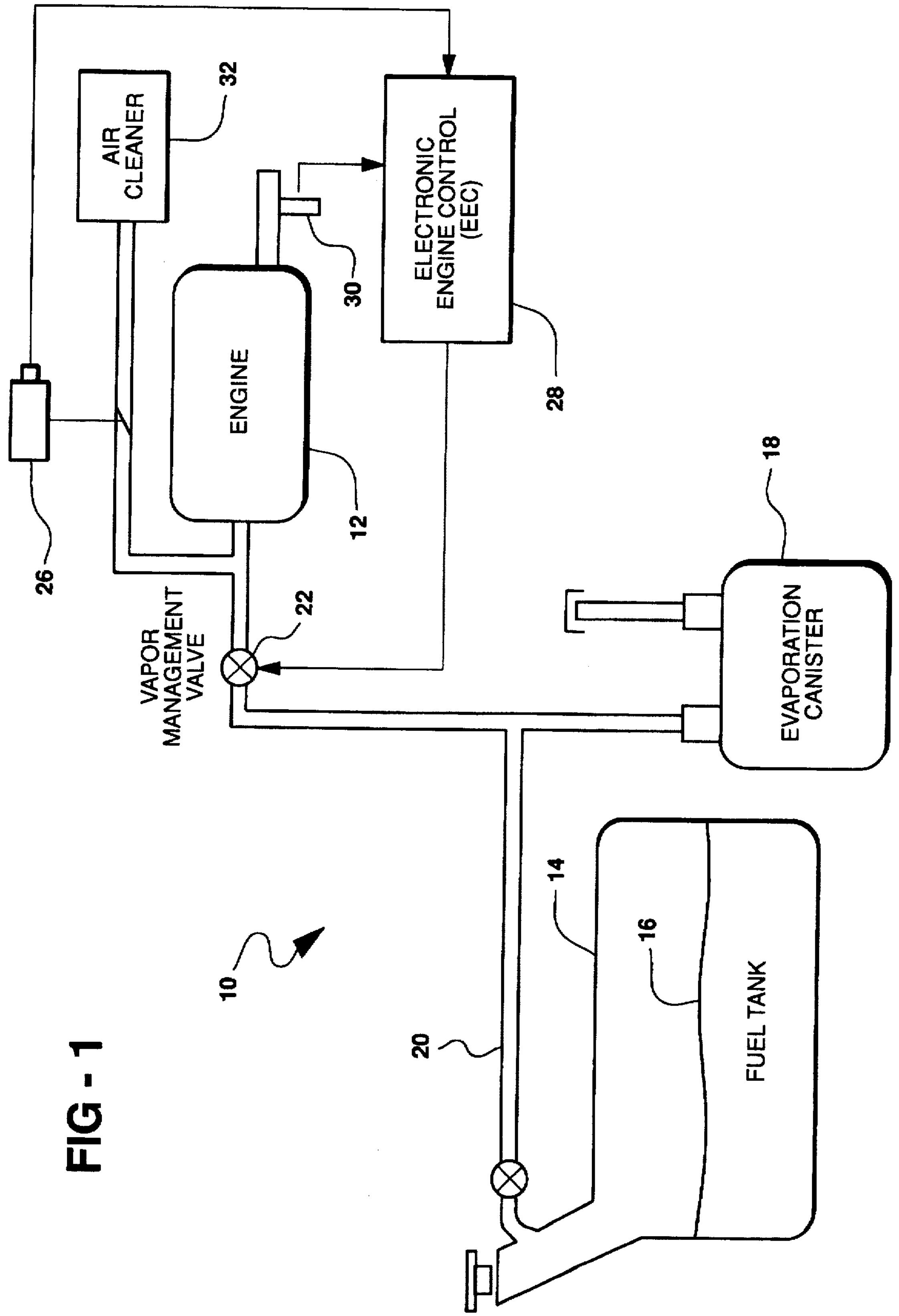
FIG. 1 is schematic view of a fuel supply system and an internal combustion engine for a motor vehicle.

Fuel supply system is generally indicated at 10 in FIG. 1. Fuel supply system 10 supplies fuel to internal combustion engine 12. Fuel supply system 10 includes fuel tank 14 for storing fuel 16 therein. Evaporative or carbon canister 18 is connected to fuel tank 14 through supply line 20. Carbon canister 18 stores fuel vapors received from fuel tank 14 through supply line 20 therein. Vapor management or purge valve 22 is connected to supply line 20. Purge valve 22 allows vapors from fuel tank 14 and carbon canister 18 to be received by internal combustion engine 12. Second supply line 24 is connected between purge valve 22, internal combustion engine 12, and an mass air flow sensor 26. The vapors released by purge valve 22 are sent through second supply line 24 to internal combustion engine 12 to be combusted thereby. Mass air flow sensor 26 senses the mixture in terms of mass per unit volume. The output of mass air flow sensor 26 is received by electronic engine control (EEC) 28. Exhaust fumes from internal combustion engine 12 are sensed by exhaust gas oxygen sensor 30, the output of which is sent to EEC 28 to identify how much fuel vapor was released by purge valve 22 and combusted by internal combustion engine 12. Air cleaner 32 filters fuel vapors from mixture received by mass air flow sensor 26 prior to being released to atmosphere.

Figure 2:
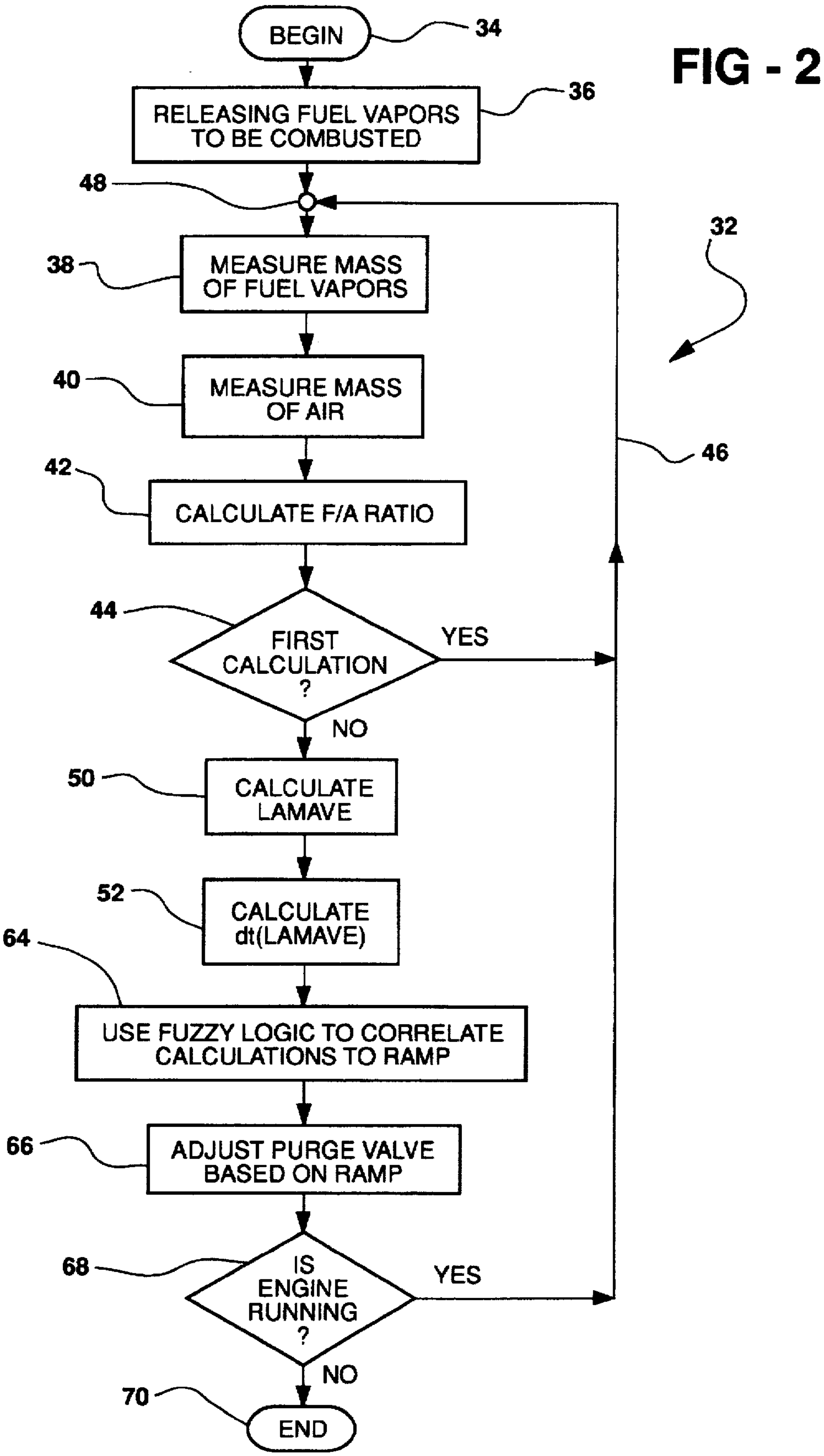
FIG. 2 is a flow chart of the method of one embodiment of the invention.

Referring to FIG. 2, a method for purging fuel vapors stored in carbon canister 18 and fuel tank 14 through purge valve 22 to be combusted by internal combustion engine 12 is generally shown at 32. Method 32 begins at 34. Fuel vapors are released by carbon canister 18 and fuel tank 14 to be combusted at 36. Mass of fuel vapors per unit volume are measured at a first time at 38. Mass of air per unit volume at a first time is measured at 40. A fuel to air (F/A) ratio is calculated at 42. It is then determined, at 44, whether the measurements taken at 38 and 40 are the first calculations. If so, those values are stored and loop 46 returns to conjunction 48 so the mass fuel vapors per unit volume and mass of air per unit volume may be measured again at 38 and 40. Subsequent measurements are taken after a predetermined time. After at least two ratios of fuel to air have been calculated, LAMAVE is calculated at 50. LAMAVE is defined as the average of the last to fuel to air ratio values.

Figure 3:
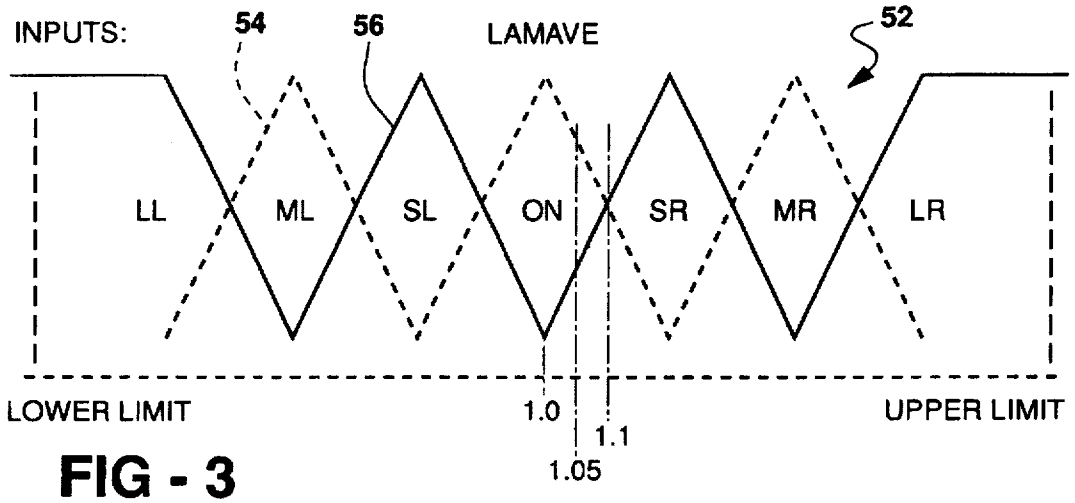
FIG. 3 is a graphic representation of LAMAVE.

Referring to FIG. 3, a graphic representation of a fuzzy logic correlation for LAMAVE is shown at 52. The fuzzy logic correlation 52 includes first triangle function 54 and second triangle function 56. First 54 and second 56 triangle functions have first and second periods, respectively, which are equal. First and second period are, however, offset from each other fifty percent of the value of the period. Values for LAMAVE are graphed along the x-axis of the graph. LAMAVE is subdivided into seven divisions they being LARGE LEAN, MEDIUM LEAN, SMALL LEAN, ONE, SMALL RICH, MEDIUM RICH, AND LARGE RICH, represented by LL, ML, SL, ON, SR, MR, LR, respectively. Using first 54 and second 56 triangle functions, fuzzy logic representation for LAMAVE 52 defines each value for LAMAVE as a percentage of one of the seven above listed divisions. By way of example, if LAMAVE has a value of 1.1, the fuzzy logic for LAMAVE 52 identifies value 1.1 being a member of both the ONE division and the SMALL RICH division. In fact, value 1.1 is identified as being fifty percent in either division for this example. Therefore, first membership value and second membership value are both fifty percent. In another example, if LAMAVE has value 1.05, although LAMAVE will still be a member of both the ONE division and the SMALL RICH division, it can be seen that LAMAVE having value 1.05 is approximately seventy percent in the ONE division and thirty percent in the SMALL RICH division. More specifically, first membership value is seventy percent and second membership value is thirty percent. Therefore, using fuzzy logic 52, LAMAVE may be correlated into two different division or categories to more accurately define the possible characterization of that particular LAMAVE value.

Figure 4:
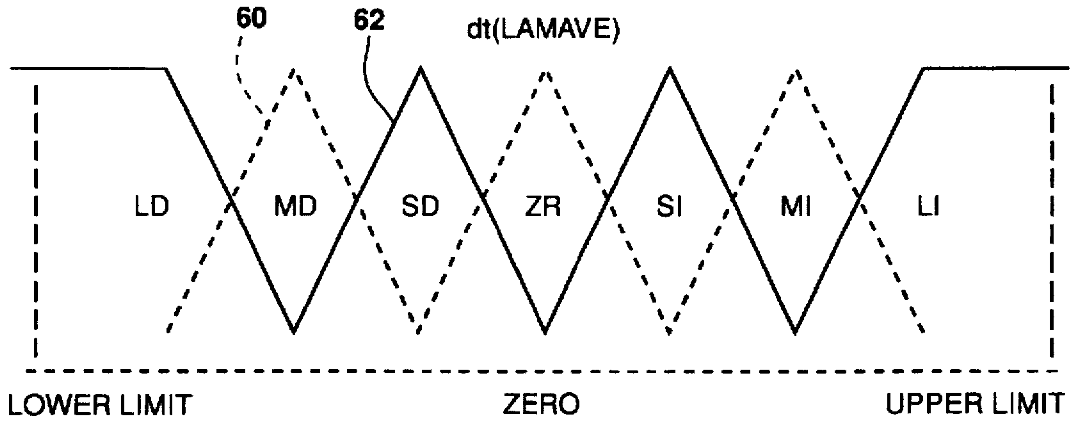
FIG. 4 is a graphic representation of the outputs of the method for the first derivative of LAMAVE.

Returning to FIG. 2, the derivative of LAMAVE is calculated at 52. The derivative of LAMAVE is defined as the rate of change of LAMAVE. The rate of change of LAMAVE, dt(LAMAVE), is also divided into seven subdivisions, they being LARGE DECREASE, MEDIUM DECREASE, SMALL DECREASE, ZERO, SMALL INCREASE, MEDIUM INCREASE, AND LARGE INCREASE, represented by LD, MD, SD, ZR, SI, MI, and LI, respectively, as is shown in FIG. 4. Again, the fuzzy logic for the derivative of LAMAVE is defined by a third triangle function 60 and a fourth triangle function 62.

Figure 5:
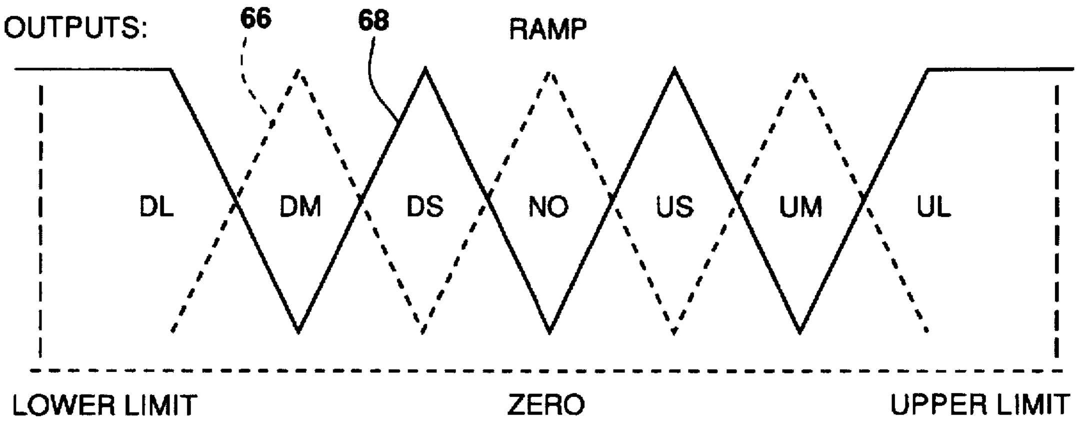
FIG. 5 is a graphic representation of the output of the method.

Once the derivative of LAMAVE, dt(LAMAVE), is correlated, fuzzy logic correlation is used to calculate a RAMP value at 64 in FIG. 2. Again, RAMP values, as shown in FIG. 5, are divided into seven subdivisions defined by fifth triangle function 66 and sixth triangle function 68. The subdivisions for RAMP are LARGE DOWN, MEDIUM DOWN, SMALL DOWN, NONE, SMALL UP, MEDIUM UP, LARGE UP, as represented by DL, DM, DS, NO, US, UM and UL, respectively. As with first triangle function 54 and second triangle function 56, third 60, fourth 62, fifth 66 and sixth 68 triangle functions all have identical periods wherein the third 60 and fourth 62 triangle functions are offset or skewed by fifty percent of the period and the fifth 66 and sixth 68 triangle functions have periods which are offset or skewed by fifty percent of the period.

Purge valve 22 is adjusted at 66 in FIG. 2. The adjustment to purge value 22 is based on the characterization or correlation of RAMP value insuring the proper stoichiometric combination of fuel and air which is received by internal combustion engine 12. If it is determined that internal combustion engine 12 is still running, the mass of fuel vapors per unit volume is again measured at 38 whereafter the method described above is continued. If internal combustion engine 12 is not running, the method is terminated at 70.

Figure 6:
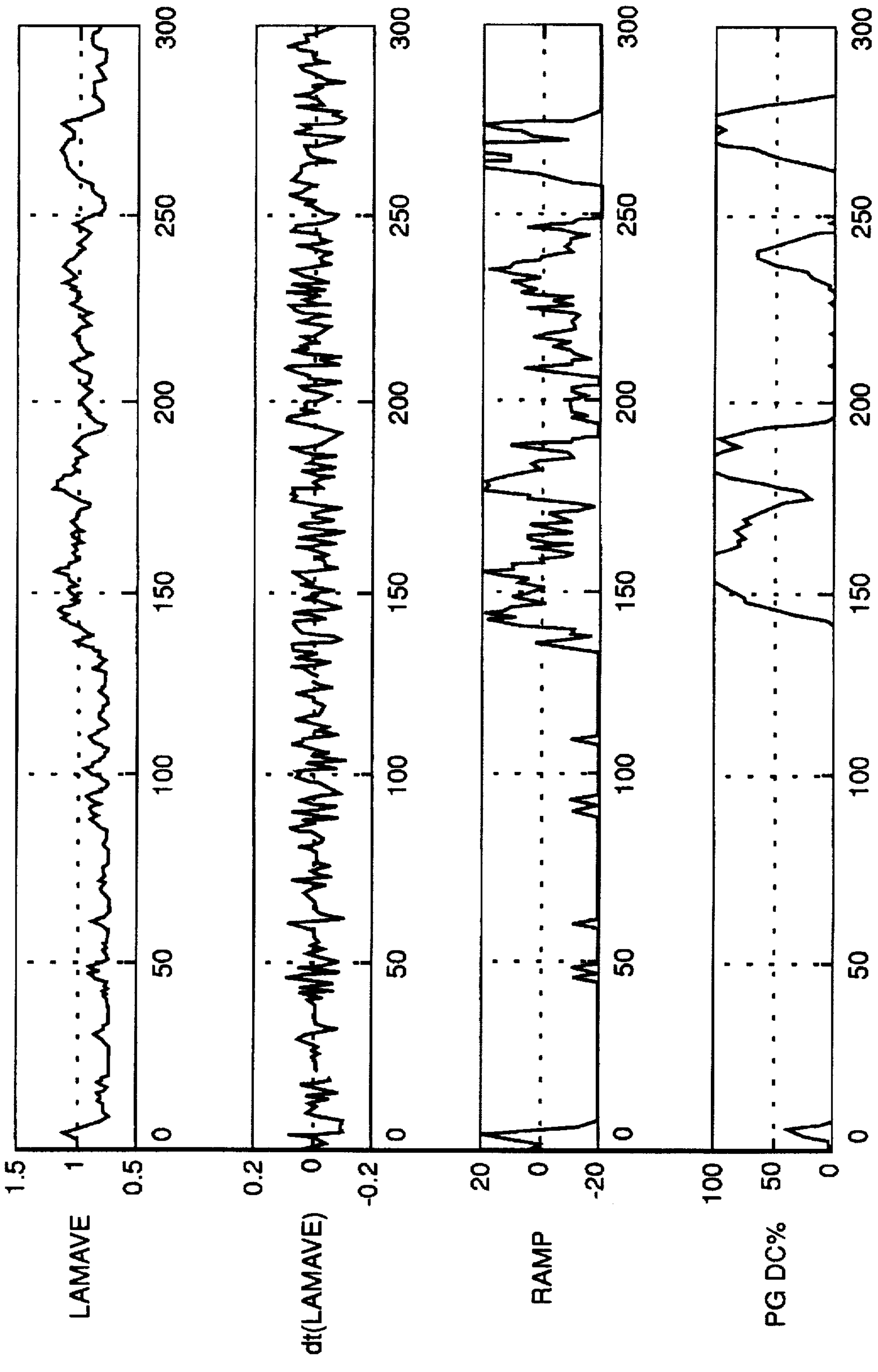
FIG. 6 is a graphic representation of inputs and outputs of one embodiment of the method.

Referring to FIG. 6, values for LAMAVE, dt(LAMAVE), RAMP and the duty cycle of purge valve 22 are graphically represented. Using the fuzzy logic correlation described above it can be shown that the duty cycle of purge valve 22 responds accurately to variations in LAMAVE. More specifically, as LAMAVE increases above one, the duty cycle for purge valve 22 increases. It should be appreciated by those skilled in the art that the duty cycle shown in FIG. 6 is for a fuel to air ratio and, consequently represents the amount of time purge valve 22 is closed. The inverse would be shown in LAMAVE was representation of an air to fuel ratio, the inverse of the fuel to air ratio described above.

This concludes a description of an example of operation in which the invention claimed herein is used to advantage. Those skilled in the art will being to mind many modifications and alterations to the example presented herein without departing from the spirit and scope of the invention. Accordingly, it is intended that the invention be limited only by the following claims.

I claim:

1. A method for purging fuel vapor stored in a fuel canister (18) and a fuel tank (14) through a purge valve (22) to be combusted by an internal combustion engine (12), the method comprising the steps of:

releasing the fuel vapors from the fuel canister (18) and fuel tank(14);

measuring a mass of fuel vapors per unit volume at a first time;

measuring a mass of air per unit volume at the first time;

calculating a ratio of the mass of fuel vapors to the mass of air;

correlating the ratio to a first function (54) to identify a first membership value;

correlating the ratio to a second function (56) to identify a second membership value;

setting a duty cycle for the purge valve (22) based on the first membership value and the second membership value; and opening the purge valve (22) as a function of the duty cycle to deliver a desired amount of fuel vapors to the internal combustion engine (12) to be combusted thereby in combination with a fuel supply.

2. A method as set forth in claim 1 including the step of measuring a mass of fuel vapors per unit volume after a predetermined time.

3. A method as set forth in claim 2 including the step of measuring the mass of air per unit volume after the predetermined time.

4. A method as set forth in claim 3 including the step of calculating a second ratio of the mass of fuel vapors to the mass of air after the predetermined time.

5. A method as set forth in claim 4 including the step of averaging the ratio and the second ratio to create an average ratio.

6. A method as set forth in claim 5 including the step of measuring rate of change between the ratio and the second ratio.

7. A method as set forth in claim 6 including the step of adjusting the duty cycle as a function of the rate of change.

8. A method for purging fuel vapors stored in a fuel canister (48) and a fuel tank (14) to a purge valve (22) to be combusted by an internal combustion engine (12), the method comprising the steps of:

releasing the fuel vapors from the fuel canister (18) and fuel tank (14);

measuring a mass of fuel vapors per unit volume;

measuring a mass of air per unit volume at a first time;

calculating a ratio of the mass of fuel vapors to the mass of air;

correlating the ratio to a first triangle function (54) to identify a first membership value;

correlating the ratio to a second triangle function (56) to identify a second membership value;

setting a duty cycle for the purge valve (22) based on the first membership value and the second membership value; and opening the purge valve (22) as a function of the duty cycle to deliver a desired amount of fuel vapors to the internal combustion engine (12) to be combusted thereby in combination with a fuel supply.

9. A method as set forth in claim 8 wherein the first triangle function (54) has a first period and the second triangle function (56) has second period, the first period being equal to the second period.

10. A method as set forth in claim 9 wherein the second triangle function (56) is skewed from the first triangle function (54) by fifty percent of the first triangle function.

11. A method for purging fuel vapors stored in a fuel canister (18) and a fuel tank (14) through a purge valve (22) to be combusted by an internal combustion engine (12), the method comprising the steps of:

releasing the fuel vapors from the fuel canister (18) and fuel tank (14);

measuring a mass of fuel vapors per unit volume at a first time;

measuring a mass of air per unit volume at a first time;

measuring a mass of fuel vapors per unit volume after a predetermined time;

measuring a mass of air per unit volume after the predetermined time;

calculating a ratio of the mass of fuel vapors to the mass of air at the first time;

calculating a second ratio of the mass of fuel vapors to the mass of air after the predetermined time;

measuring rate of change between the ratio and the second ratio;

correlating the rate of change to a first triangle function (54) to identify a first membership value;

correlating the rate of change to a second triangle function (56) to identify a second membership value;

setting a duty cycle for the purge valve (22) based on the first membership value and the second membership value; and opening the purge valve (22) as a function of the duty cycle to deliver a desired amount of fuel vapors to the internal combustion engine (12) to be combusted thereby in combination with a fuel supply.

12. A method as set forth in claim 11 wherein the first triangle function (54) has a first period and the second triangle function (56) has a second period, the first period being equal to the second period.

13. A method as set forth in claim 12 wherein the second triangle function (56) is skewed from the first triangle function by fifty percent of the first.

* * * * *